(12) United States Patent
Kuhn et al.

(10) Patent No.: US 10,618,576 B2
(45) Date of Patent: Apr. 14, 2020

(54) TRACKED PISTE GROOMING VEHICLE FOR MAINTENANCE AND SHAPING OF SNOWY TERRAIN

(71) Applicants: Michael Kuhn, Achstetten (DE); Bernd Junginger, Blaustein-Bermaringen (DE)

(72) Inventors: Michael Kuhn, Achstetten (DE); Bernd Junginger, Blaustein-Bermaringen (DE)

(73) Assignee: KAESSBOHRER GELAENDEFAHRZEUG AG, Laupheim (DE)

( * ) Notice: Subject to any disclaimer, the term of this patent is extended or adjusted under 35 U.S.C. 154(b) by 104 days.

(21) Appl. No.: 15/419,350

(22) Filed: Jan. 30, 2017

(65) Prior Publication Data

US 2017/0233017 A1 Aug. 17, 2017

(30) Foreign Application Priority Data

Feb. 11, 2016 (EP) ..................................... 16155191

(51) Int. Cl.
*B62D 55/104* (2006.01)
*B62D 55/108* (2006.01)
(Continued)

(52) U.S. Cl.
CPC .............. *B62D 55/08* (2013.01); *B62D 55/06* (2013.01); *B62D 55/104* (2013.01);
(Continued)

(58) Field of Classification Search
CPC ...... B62D 55/08; B62D 55/06; B62D 55/108; B62D 55/1083; B62D 55/14; B62D 55/104; B62D 55/116; E01H 4/02
(Continued)

(56) References Cited

U.S. PATENT DOCUMENTS 2,277,855 A * 3/1942 Mercier ................. B62D 11/20
180/9.46
3,262,522 A   7/1966 Johnson et al.
(Continued)

FOREIGN PATENT DOCUMENTS

DE        931 994 C    8/1955
DE    101 60 918 A1    6/2003
(Continued)

OTHER PUBLICATIONS

Search Report of European Patent Office issued in Application No. 16155191 with English translation of category of cited documents dated Aug. 17, 2016 (12 pages).

*Primary Examiner* — Anne Marie M Boehler
(74) *Attorney, Agent, or Firm* — Flynn Thiel, P.C.

(57) ABSTRACT

Tracked piste grooming vehicle for maintenance and shaping of snowy terrain, including a crawler chassis which includes, on each side of the chassis, a respective drive wheel, at least four running wheels and a tension wheel, all enclosed by a crawler chain, wherein each running wheel is mounted on a chassis frame in a pretensioned manner by a suspension. Each side of the chassis includes five respective running wheels, with the suspensions thereof having a different pretensioning distribution considered over a vehicle length.

15 Claims, 5 Drawing Sheets

(51) Int. Cl.
*B62D 55/116* (2006.01)
*E01H 4/02* (2006.01)
*B62D 55/08* (2006.01)
*B62D 55/30* (2006.01)
*B62D 55/112* (2006.01)
*B62D 55/06* (2006.01)

(52) U.S. Cl.
CPC .......... *B62D 55/112* (2013.01); *B62D 55/116* (2013.01); *B62D 55/305* (2013.01); *E01H 4/02* (2013.01)

(58) Field of Classification Search
USPC ............................... 180/9.54, 9.52, 9.58, 9.5
See application file for complete search history.

(56) References Cited

U.S. PATENT DOCUMENTS

| | | | | |
|---|---|---|---|---|
| 3,504,930 A | * | 4/1970 | Kozowyk | B62D 55/1083 180/9.1 |
| 4,068,732 A | * | 1/1978 | Granryd | B62D 11/04 180/6.7 |
| 4,194,761 A | * | 3/1980 | Falk | B60G 11/185 267/284 |
| 4,325,443 A | * | 4/1982 | Fischer | B62D 55/08 180/22 |
| 4,475,775 A | * | 10/1984 | Orlandea | B62D 55/08 16/225 |
| 4,500,139 A | * | 2/1985 | Tucek | B62D 55/116 305/128 |
| 5,176,573 A | * | 1/1993 | Dow | A01D 45/02 460/119 |
| 5,363,936 A | * | 11/1994 | Grawey | B62D 55/06 180/9.21 |
| 5,647,721 A | * | 7/1997 | Rohrbaugh | E02F 3/286 180/9.1 |
| 5,909,780 A | * | 6/1999 | De Andrade | B60G 11/20 180/294 |
| 7,740,094 B2 | | 6/2010 | Pelletier | |
| 9,567,005 B1 | * | 2/2017 | Kaloust | B62D 1/283 |
| 9,937,969 B2 | * | 4/2018 | Obermeier-Hartmann | B62D 55/112 |
| 10,202,155 B2 | * | 2/2019 | Eavenson, Sr. | B62D 55/02 |
| 2003/0154633 A1 | * | 8/2003 | Lassonde | E01H 4/02 37/219 |
| 2005/0087374 A1 | | 4/2005 | Kanzler et al. | |
| 2009/0013562 A1 | | 1/2009 | Pelletier | |
| 2011/0174555 A1 | * | 7/2011 | Willim | B62D 55/112 180/9.52 |
| 2014/0288763 A1 | | 9/2014 | Bennett et al. | |
| 2015/0114730 A1 | * | 4/2015 | Gulliksson | B60G 3/14 180/9.54 |
| 2016/0023695 A1 | * | 1/2016 | Obermeier-Hartmann | B62D 55/112 180/9.54 |
| 2016/0068205 A1 | * | 3/2016 | Hellholm | B62D 55/112 180/9.54 |
| 2016/0318423 A1 | * | 11/2016 | Thibault | E01H 4/02 |

FOREIGN PATENT DOCUMENTS

| | | | |
|---|---|---|---|
| DE | 10 2012 214 386 A1 | 2/2014 | |
| EP | 1 995 159 A1 | 11/2008 | |
| EP | 2 639 354 A2 | 9/2013 | |
| GB | 528280 | * 10/1940 | ......... B62D 55/1083 |
| JP | 58089480 A | 5/1983 | |
| JP | 61001581 A | 1/1986 | |
| NL | 9201553 | 4/1994 | |

\* cited by examiner

TRACKED PISTE GROOMING VEHICLE FOR MAINTENANCE AND SHAPING OF SNOWY TERRAIN

CROSS-REFERENCE TO RELATED APPLICATIONS

This claims priority from European Patent Application No. 16155191.6, filed on Feb. 11, 2016, the disclosure of which is hereby incorporated by reference in its entirety into this application.

FIELD OF THE INVENTION

The invention relates to a tracked piste grooming vehicle for maintenance and shaping of snowy terrain, comprising a crawler chassis which includes, on each side of the chassis, a respective drive wheel, at least four running wheels and a tension wheel, all enclosed by a crawler chain, wherein each running wheel is mounted on a chassis frame in a pretensioned manner by means of a suspension.

BACKGROUND OF THE INVENTION

EP 1 995 159 B1 discloses a snow groomer to combine high performance and good manoeuvrability. The snow groomer has a crawler chassis which includes, on each side of the chassis, four respective running wheels, in addition to a drive wheel and a tension wheel. The good manoeuvrability with high performance is to be achieved by different axle load distributions on the tension wheel and on the four running wheels on each side of the chassis. Therein, the axle load gradually increases starting from the front tension wheel axle across the four running wheels to the rear in such a manner that the two rear running wheels have to bear most of the axle load.

SUMMARY OF THE INVENTION

The object of the invention is to provide a tracked piste grooming vehicle of the above mentioned type which presents an improved gradability and improved functionality for maintenance and shaping of snowy terrain.

This object is achieved in that each side of the chassis includes five respective running wheels, with the suspensions thereof having a different pretensioning distribution considered over a vehicle length. Consequently, according to the invention, there is one additional running wheel axle provided, as compared to the well-known groomer devices. As a result, there is improved gradability of the tracked piste grooming vehicle obtained. Furthermore, in relation to a contact plane of the tracked piste grooming vehicle, there is also a lower relative inclination in the vehicle longitudinal direction during vehicle operation. The additional running wheel axle allows a longer crawler chain, enabling reduced surface pressure and, consequently, protection of the passed ground. The additional running wheel axle allows reduced slip during vehicle operation due to the thus increased contact length of the crawler chain. As a result, fuel consumption of the tracked piste grooming vehicle is also reduced. Owing to the fact that the suspensions of the running wheels have different pretensioning distributions considered over a vehicle length, there is improved steering performance by a reduced turning resistance obtained. Advantageously, the pretensioning distribution of the suspensions of the running wheels is provided such that the highest pretensioning is provided in the region of the suspensions of the two sides of the chassis, which are located in the vicinity of the center of gravity of the vehicle.

In an embodiment of the invention, the pretensioning distribution of the suspensions of the running wheels is provided such that at least one central running wheel disposed between a frontmost and a rearmost running wheel has a superior pretensioning towards a ground than at least one adjacent running wheel adjoining to the front or to the rear. In said embodiment, the tracked piste grooming vehicle has a center of gravity of the vehicle located in the region of the center of the crawler chassis. If the crawler chassis is raised from a ground with the corresponding pretensioning distribution of the suspensions, then the running wheels necessarily hang downwards in different levels due to the different pretensionings and the relief caused by the lifting, wherein the central running wheel with the highest pretensioning hangs down furthest and the adjacent running wheels each are positioned somewhat further above, so that a concave, banana-type curvature results for the axles of the running wheels in a side view.

In a further embodiment of the invention, each drive wheel is disposed upwardly offset in relation to a plane of tension wheel and running wheels in the vertical direction of the vehicle. The described plane of tension wheel and running wheels is to be understood in the ready-for-operation condition of the tracked piste grooming vehicle standing on a ground. Elevation of the drive wheel allows an improved compensation ability of the crawler chassis in case of unevenness of the floor.

In a further embodiment of the invention, a central combustion engine of the tracked piste grooming vehicle has an engine power of more than 400 kW. Said engine power contributes to achieve a tracked piste grooming vehicle presenting high efficiency in the region of a rear tiller and/or by means of a rake blade and/or by means of a winch. The fifth running wheel axle according to the invention together with the engine power of more than 400 kW allows a very expanded design of the tracked piste grooming vehicle and, consequently, machinability of a piste over a large working width.

In a further embodiment of the invention, the running wheels of each side of the chassis are disposed at such a distance to each other that during vehicle operation bending up of a lower run of the crawler chain between two respective running wheels is prevented at least largely. As a result, a particularly uniform motion of the crawler chain is achieved.

Further advantages and features of the invention will become apparent from the claims and from the description below of a preferred exemplary embodiment of the invention, illustrated with reference to the drawings.

DETAILED DESCRIPTION

Figure 1:
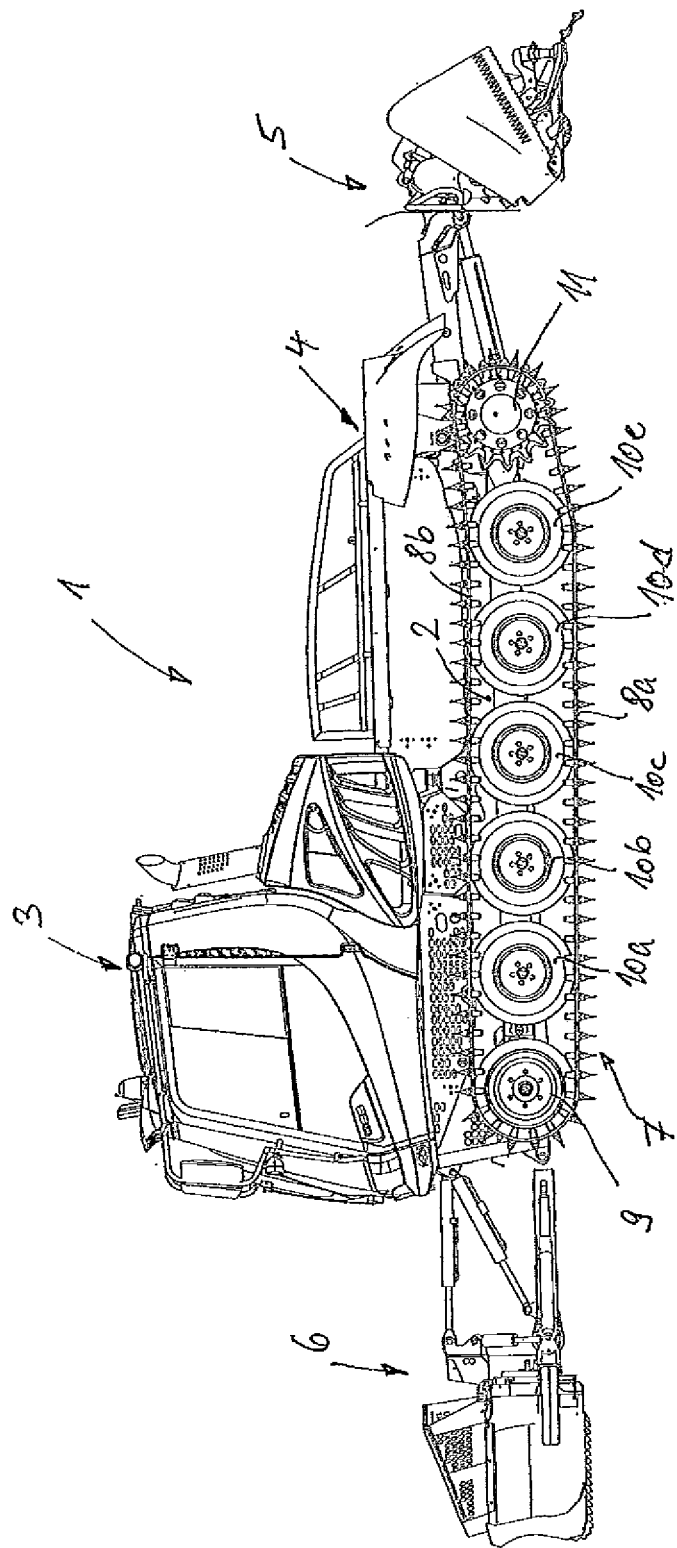
FIG. 1 shows a side view of an embodiment of a tracked piste grooming vehicle according to the invention.

A tracked piste grooming vehicle 1 according to FIGS. 1 to 5 includes a chassis frame 2 with a driver cabin 3 assembled on the front side thereof and a cargo area 4 assembled on the rear side thereof. On the rear side of the chassis frame 2 a rear equipment rack is provided, whereon a rear tiller 5 is removably attached. On the end face in a front region of the tracked piste grooming vehicle 1 a rake blade 6 is provided on the chassis frame 2. On opposite longitudinal sides of the chassis frame 2, a respective side of the chassis 7 of a crawler chassis is provided. Each of the two sides of the chassis 7 has a tension wheel on the front side and five running wheels 10a to 10e successively arranged in the longitudinal direction of the vehicle towards the rear. A drive wheel 11 constitutes a rear-sided termination of the side of the chassis. The tension wheel 9, the running wheels 10a to 10e and the drive wheel are enclosed by a crawler chain 8a, 8b which includes a lower run 8a running on a ground and an upper run 8b running in the opposite direction during vehicle operation. The drive wheel 11 of each side of the chassis is for driving the crawler chain 8a, 8b. The tension wheel 9 is for tensioning the crawler chain 8a, 8b.

The two drive wheels 11 of the crawler chassis are driven by hydraulic motors of a hydraulic system which is fed by a central hydraulic variable pump. The variable pump is driven by a combustion engine in the form of a diesel engine, with merely the exhaust system thereof illustrated in FIGS. 1 to 3. The combustion engine is positioned in the chassis frame 2, a short length behind and below the driver cabin 3. The combustion engine has an engine power of more than 400 kW. Via the hydraulic system, in addition to driving the crawler chassis, also the rear tiller 5 and the front-sided rake blade 6 are supplied and controlled by hydraulics. For controlling the combustion engine and the hydraulic system, an electric and/or electronic control system is provided, which will not be described in more detail herein.

Figure 2:
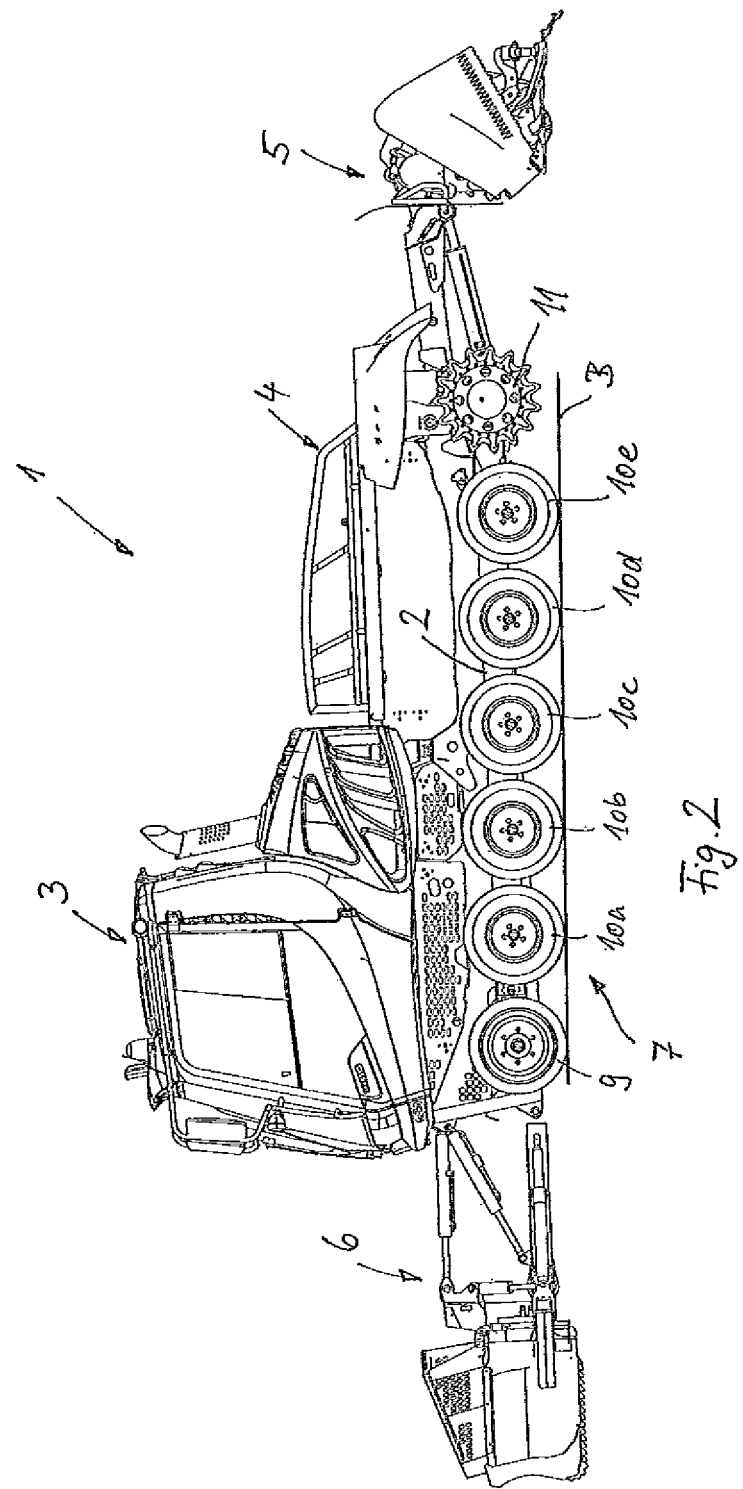
FIG. 2 shows the tracked piste grooming vehicle according to FIG. 1 with the crawler chain omitted.
Figure 3:
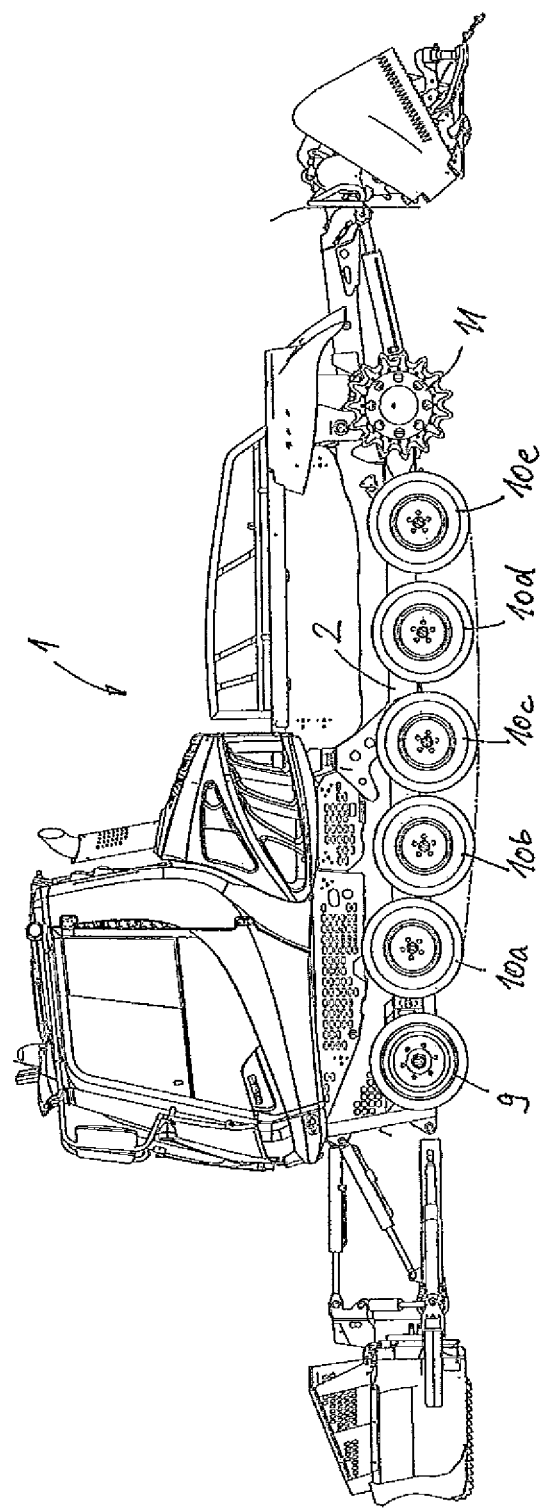
FIG. 3 shows the tracked piste grooming vehicle according to FIG. 2 with the running wheels of the side of the chassis in the unloaded condition.
Figure 4:
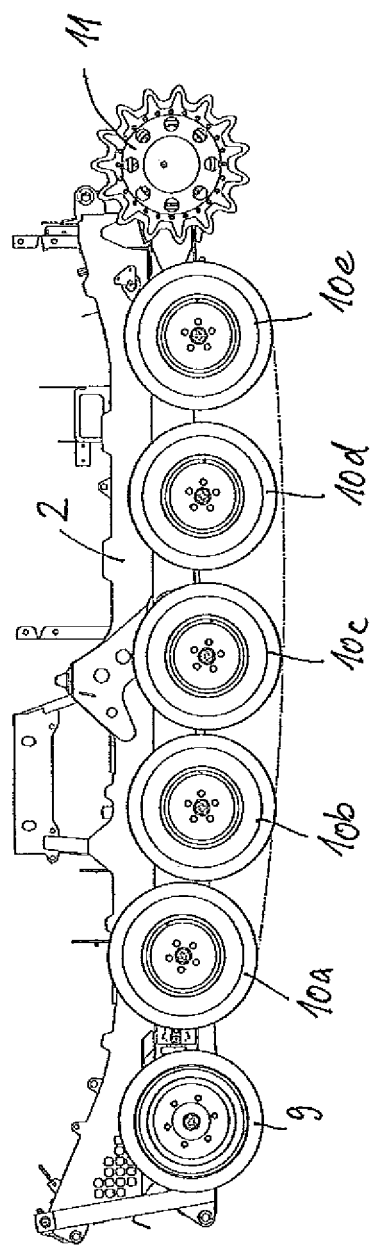
FIG. 4 shows a side view of the side of the chassis of the tracked piste grooming vehicle according to FIG. 3 with a chassis frame of the tracked piste grooming vehicle according to FIG. 3.
Figure 5:
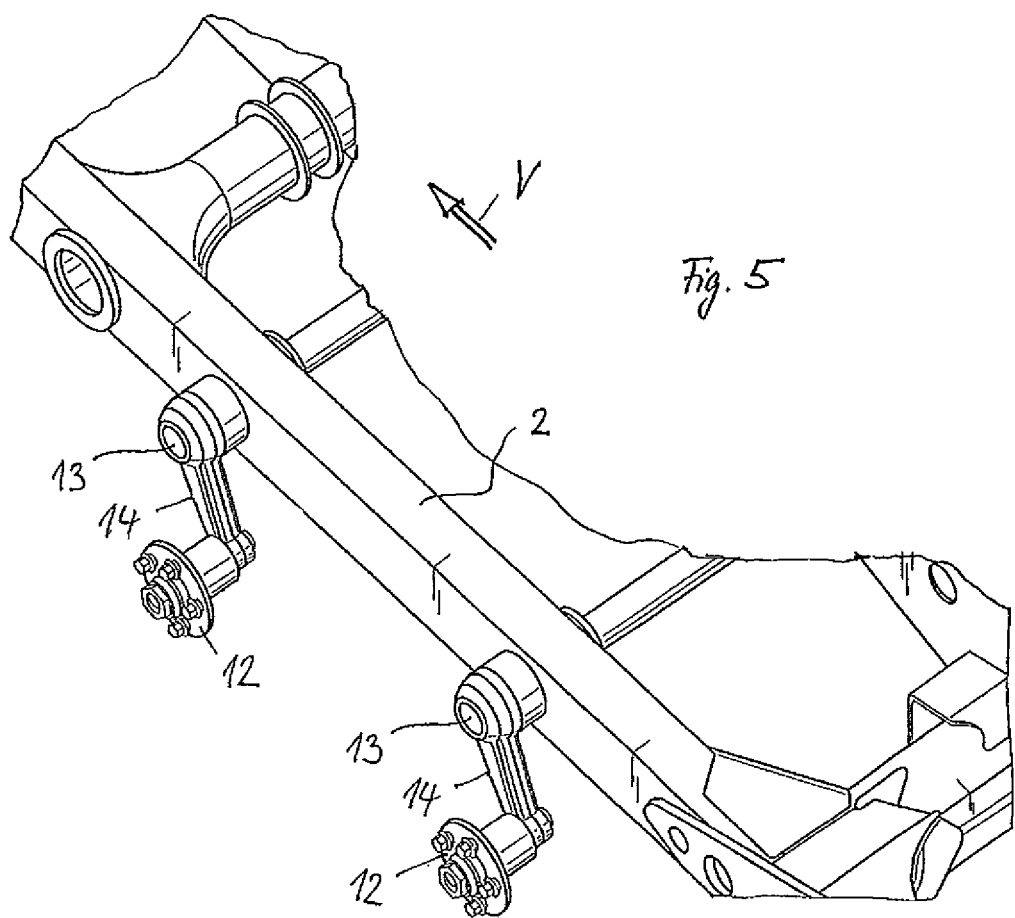
FIG. 5 shows an enlarged, schematic perspective view of a detail of the side of the chassis in the region of two suspensions for two running wheels.

Each of the five running wheels 10a to 10e of each side of the chassis 7 is mounted on the chassis frame 2 by a respective suspension 12 to 14. Each suspension includes a wheel hub 12 mounted on a suspension arm 14 to be rotatable about a running wheel axle. Each running wheel 10a to 10e is fixed to a corresponding wheel hub 12. Each suspension arm 14 is mounted on the chassis frame 2 to be pivotable about a jointed cross-shaft axle parallel to the respective running wheel axle. The jointed cross-shaft axle is disposed—as seen in the headway direction V of the tracked piste grooming vehicle 1—ahead of the respective running wheel axle. The suspension arm 14 protrudes from the jointed cross-shaft axle obliquely rearwards and downwards. The suspension arm 14 is elastically pretensioned by a pretensioning device 13, in the present case in the form of a torsion bar spring, downwards in the direction of a ground B (FIG. 2). Once the respective running wheel 10a to 10e rests on the ground B, each suspension arm 14 is pivoted upwards counter to the pretensioning direction of the pretensioning device 13.

The different suspensions 12 to 14 of the running wheels 10a to 10e are each provided with correspondingly forwards or rearwards reduced pretensionings and, consequently, with reduced axle loads. The thus selected distribution of pretensioning of the running wheels 10a to 10e results in a relatively manoeuvrable tracked piste grooming vehicle 1 during vehicle operation, since the highest axle load and, consequently, the highest pretensioning of the running wheels 10c is located in the region of the center of gravity of the vehicle. Regardless of the five running wheels 10a to 10e on each side of the chassis 7 and a long chain contact length of the crawler chain 8a, 8b, there is, consequently, a comparatively low turning resistance obtained for the tracked piste grooming vehicle 1, resulting in good steerability of the tracked piste grooming vehicle 1.

With reference to FIG. 1, it is apparent that the distances of the running wheel axles of the running wheels 10a to 10e in relation to the diameter of the running wheels 10a to 10e is selected such that, during vehicle operation, the lower run 8a of the crawler chain 8a, 8b cannot bend up in the respective wedged clear spacing between two respective adjacent running wheels 10a to 10e. The drive wheel 11 of each side of the chassis 7 is upwardly offset in relation to the plane of the running wheels 10a to 10e and the tension wheel 9 in the vertical direction of the vehicle, as becomes clear with reference to FIGS. 1 to 4.

The invention claimed is:

1. A tracked piste grooming vehicle for maintenance and shaping of snowy terrain, the tracked piste grooming vehicle comprising:
   a crawler chassis which includes, on each side of the crawler chassis, a drive wheel, at least five running wheels and a tension wheel, all enclosed by a crawler chain, wherein each running wheel is mounted on a chassis frame in a pretensioned manner by a suspension, wherein a pretensioning distribution of the suspensions of the at least five running wheels, considered over a vehicle length in a front to rear direction thereof, is provided such that at least one central running wheel disposed between a frontmost and a rearmost running wheel has a greater pretensioning towards a ground than at least one running wheel disposed adjacent a front of the at least one central running wheel and at least one running wheel disposed adjacent a rear of the at least one central running wheel, wherein the pretensioning, distribution is provided such that same progressively decreases in a first direction from the at least one central running wheel to the rearmost running wheel and progressively decreases in a second direction from the at least one central running wheel to the frontmost running wheel;
   a tiller provided on a rear region of the tracked piste grooming vehicle; and
   a blade provided on a front region of the tracked piste grooming vehicle.

2. The tracked piste grooming vehicle according to claim 1, wherein each drive wheel has an axis of rotation that is positioned above, in a vertical direction, centers of rotation of each of the tension wheel and the at least five running wheels.

3. The tracked piste grooming vehicle according to claim 1, wherein a central combustion engine of the tracked piste grooming vehicle has an engine power of more than 400 kW.

4. The tracked piste grooming vehicle according to claim 1, wherein the at least five running wheels of each side of the chassis are disposed at a distance relative to each other such that, during operation of the tracked piste grooming vehicle, upward bending of a lower run of the crawler chain between two consecutive running wheels is substantially prevented.

5. The tracked piste grooming vehicle according to claim 1, wherein the at least one central running wheel of the at least five running wheels has the greatest pretensioning of all of the running wheels.

6. The tracked piste grooming vehicle according to claim 1, wherein the pretensioning distribution is provided to each of the at least five running wheels by a mechanical continuous pretensioning device.

7. The tracked piste grooming vehicle according to claim 6, wherein the mechanical continuous pretensioning device comprises a torsion bar spring.

8. A tracked piste grooming vehicle for maintenance and shaping of snowy terrain, comprising:
   a tiller disposed at a front end region of said tracked piste grooming vehicle;
   a blade disposed at a rear end region of said tracked piste grooming vehicle;
   a crawler chassis frame having first and second sides spaced from one another in a direction transverse to a front to rear direction of said tracked piste grooming vehicle; and
   a wheel assembly mounted on each of said first and second sides of said crawler chassis frame, each said wheel assembly including five running wheels, a drive wheel and a tension wheel all enclosed by a crawler chain, each of said running wheels being mounted on the respective said first or second side of said crawler chassis frame by a suspension, wherein said five running wheels of each said wheel assembly are pretensioned by their respective suspensions in a direction towards the ground such that a pretensioning distribution of said five running wheels progressively decreases in a first direction from a central one of said five running wheels towards a rearmost one of said five running wheels located rearwardly of said central one of said five running wheels and progressively decreases in a second direction from said central one of said five running wheels towards a frontmost one of said five running wheels located frontwardly of said central one of said five running wheels.

9. The tracked piste grooming vehicle according to claim 8, wherein said central one of said five running wheels has the highest pretension of all of said five running wheels.

10. The tracked piste grooming vehicle according to claim 8, wherein said drive wheels, said tension wheels and said five running wheels are rotatable about respective axes of rotation and the axis of rotation of each of said drive wheels is positioned vertically above the axes of rotation of said tension wheels and said five running wheels.

11. The tracked piste grooming vehicle according to claim 8, wherein each said suspension includes a suspension arm, a wheel hub mounted on said suspension arm for rotation about a wheel axis and a pretensioning device mounting said suspension arm to said crawler chassis frame for movement relative thereto, each of said five running wheels being mounted on a respective one of said wheel hubs for rotation therewith about the respective wheel axis.

12. The tracked piste grooming vehicle according to claim 11, wherein each said pretensioning device pretensions the respective said suspension arm in a direction towards the ground.

13. The tracked piste grooming vehicle according to claim 8, wherein the pretensioning distribution is provided to each of the five running wheels by a mechanical continuous pretensioning device.

14. The tracked piste grooming vehicle according to claim 13, wherein the mechanical continuous pretensioning device comprises a torsion bar spring.

15. A tracked piste grooming vehicle for maintenance and shaping of snowy terrain, comprising:
   a tiller disposed at a front end region of said tracked piste grooming vehicle;
   a blade disposed at a rear end region of said tracked piste grooming vehicle;
   a crawler chassis frame having first and second sides spaced from one another in a direction transverse to a front to rear direction of said tracked piste grooming vehicle; and
   a wheel assembly mounted on each of said first and second sides of said crawler chassis frame, each said wheel assembly including five running wheels, a drive wheel and a tension wheel all enclosed by a crawler chain, each of said running wheels being mounted on the respective said first or second side of said crawler chassis frame by a suspension, each said suspension mounting the respective said running wheel on said crawler chassis frame for rotation about an axis and pretensioning the respective said running wheel in a direction towards the ground, a central one of said five running wheels of each said wheel assembly having the highest pretension of all of said five running wheels, said five running wheels of each said wheel assembly being pretensioned by their respective suspensions towards the ground such that a pretensioning distribution of said five running wheels progressively decreases in a first direction from said central one of said five running wheels to a rearmost one of said five running wheels and progressively decreases in a second direction from said central one of said five running wheels to a frontmost one of said five running wheels such that when said tracked piste grooming vehicle is lifted away from the ground, a line intersecting each of the axes of said five running wheels of each said wheel assembly has a downwardly concave curvature when each said wheel assembly is viewed from a side of said tracked piste grooming vehicle.

* * * * *